(12) United States Patent
Bostick et al.

(10) Patent No.: US 8,305,609 B2
(45) Date of Patent: Nov. 6, 2012

(54) PRIORITIZING PRINT REQUESTS FOR A CONFIGURABLE SHARED NETWORK PRINTER

(75) Inventors: James Edward Bostick, Cedar Park, TX (US); John Michael Ganci, Jr., Cary, NC (US); John Paul Kaemmerer, Plugerville, TX (US); David Scott Wenk, Byron Center, MI (US); Sharon Woodall White, Concord, NC (US)

(73) Assignee: International Business Machines Corporation, Armonk, NY (US)

( * ) Notice: Subject to any disclaimer, the term of this patent is extended or adjusted under 35 U.S.C. 154(b) by 1218 days.

(21) Appl. No.: 12/116,591

(22) Filed: May 7, 2008

(65) Prior Publication Data

US 2009/0279121 A1    Nov. 12, 2009

(51) Int. Cl.
    *G06K 15/00* (2006.01)
(52) U.S. Cl. ............... 358/1.15; 358/1.14; 358/442
(58) Field of Classification Search .......... 358/1.15, 358/1.14, 442
    See application file for complete search history.

(56) References Cited

U.S. PATENT DOCUMENTS

| | | | |
|---|---|---|---|
| 4,882,604 A | 11/1989 | Kato et al. | |
| 5,287,194 A | 2/1994 | Lobiondo | |
| 5,452,068 A | 9/1995 | Farrell | |
| 5,547,178 A | 8/1996 | Costello | |
| 5,668,938 A | 9/1997 | Tomory | |
| 5,697,040 A | 12/1997 | Rabjohns et al. | |
| 5,883,724 A * | 3/1999 | Yamada | 358/442 |
| 5,937,225 A | 8/1999 | Samuels | |
| 6,018,636 A | 1/2000 | Caruthers et al. | |
| 6,084,688 A | 7/2000 | Stumbo et al. | |
| 6,130,757 A * | 10/2000 | Yoshida et al. | 358/1.15 |
| 6,148,346 A * | 11/2000 | Hanson | 719/321 |
| 6,213,652 B1 | 4/2001 | Suzuki et al. | |
| 6,227,531 B1 | 5/2001 | Guerrero | |
| 6,433,884 B1 | 8/2002 | Kawakami | |
| 6,504,621 B1 | 1/2003 | Salgado et al. | |
| 6,504,624 B1 | 1/2003 | Muench et al. | |

(Continued)

FOREIGN PATENT DOCUMENTS

EP    0729090 A1    8/1996

OTHER PUBLICATIONS

Office Action issued on Jan. 19, 2006 for U.S. Appl. No. 09/692,390.

(Continued)

*Primary Examiner* — King Poon
*Assistant Examiner* — Allen H Nguyen
(74) *Attorney, Agent, or Firm* — Yee & Associates, P.C.; Mark C. Vallone

(57) ABSTRACT

A computer implemented method and program product for configuring and prioritizing local network print requests. In one embodiment, a printer shared on multiple networks is configured to a set of parameters defined by an administrator for prioritizing the print requests received from users on a local network. A first print request is received from a first user on a remote network. The first print request originating from the first user on a remote network is printed. A second print request is received from a second user on a local network. A determination is made whether a match to the set of parameters is present. In response to determining a match to the set of parameters is present, the first print request is interrupted in order to print the second print request on the printer. The first print request from the remote network is resumed once the second print request from the local network is completely printed.

20 Claims, 4 Drawing Sheets

U.S. PATENT DOCUMENTS

| | | |
|---|---|---|
| 6,549,947 B1 | 4/2003 | Suzuki |
| 6,865,284 B2 | 3/2005 | Mahoney et al. |
| 6,917,437 B1 | 7/2005 | Myers et al. |
| 2002/0063884 A1* | 5/2002 | Bhogal et al. ................ 358/1.15 |
| 2004/0194013 A1* | 9/2004 | Nishikawa .................... 715/500 |
| 2005/0165978 A1* | 7/2005 | Kim ............................... 710/15 |
| 2006/0221384 A1* | 10/2006 | Tanaka ......................... 358/1.15 |
| 2008/0186530 A1* | 8/2008 | Kurozasa ..................... 358/1.15 |

OTHER PUBLICATIONS

Office Action issued on Jun. 14, 2006 for U.S. Appl. No. 09/692,390.

Final Office Action issued on Oct. 30, 2006 for U.S. Appl. No. 09/692,390.

Final Office Action issued on Dec. 27, 2007 for U.S. Appl. No. 09/692,390.

* cited by examiner

PRIORITIZING PRINT REQUESTS FOR A CONFIGURABLE SHARED NETWORK PRINTER

BACKGROUND OF THE INVENTION

1. Field of the Invention

The present invention relates generally to a data processing system and in particular to a method and apparatus for prioritizing print requests for a shared network printer. Still more particularly, the illustrative embodiments are directed to a computer implemented method, and computer usable program product for controlling print requests to a shared network printer by prioritizing print requests from a local network.

2. Description of the Related Art

Computer printers in many establishments are often shared by multiple users and over multiple networks. Due to a shortage of space and/or resources, individual printers may not be individually assigned per user. Instead, network printers are normally shared. In some cases, there will only be one printer available for a very large group of people. Frequently, a user is unable to quickly print a document because the network printer is already busy. For a user who is on a local network, this is frequently a problem since the user may need a document quicker than the user printing from a remote network. If the network printer is also printing a very large document, that is either hundreds of pages or consumes a large amount of toner and memory, the user is unable to obtain needed documents quickly.

BRIEF SUMMARY OF THE INVENTION

The illustrative embodiments provide a computer implemented method and program product for configuring and prioritizing local network print requests. In one embodiment, a printer shared on multiple networks is configured to a set of parameters defined by an administrator for prioritizing the print requests received from users on a local network. A first print request is received from a first user on a remote network. The first print request originating from the first user on a remote network starts printing. A second print request is received from a second user on a local network. A determination is made whether a match to the set of parameters is present. In response to determining a match to the set of parameters is present, the first print request is interrupted in order to print the second print request on the printer. The first print request from the remote network is resumed once the second print request from the local network is completely printed.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE INVENTION

Figure 1:
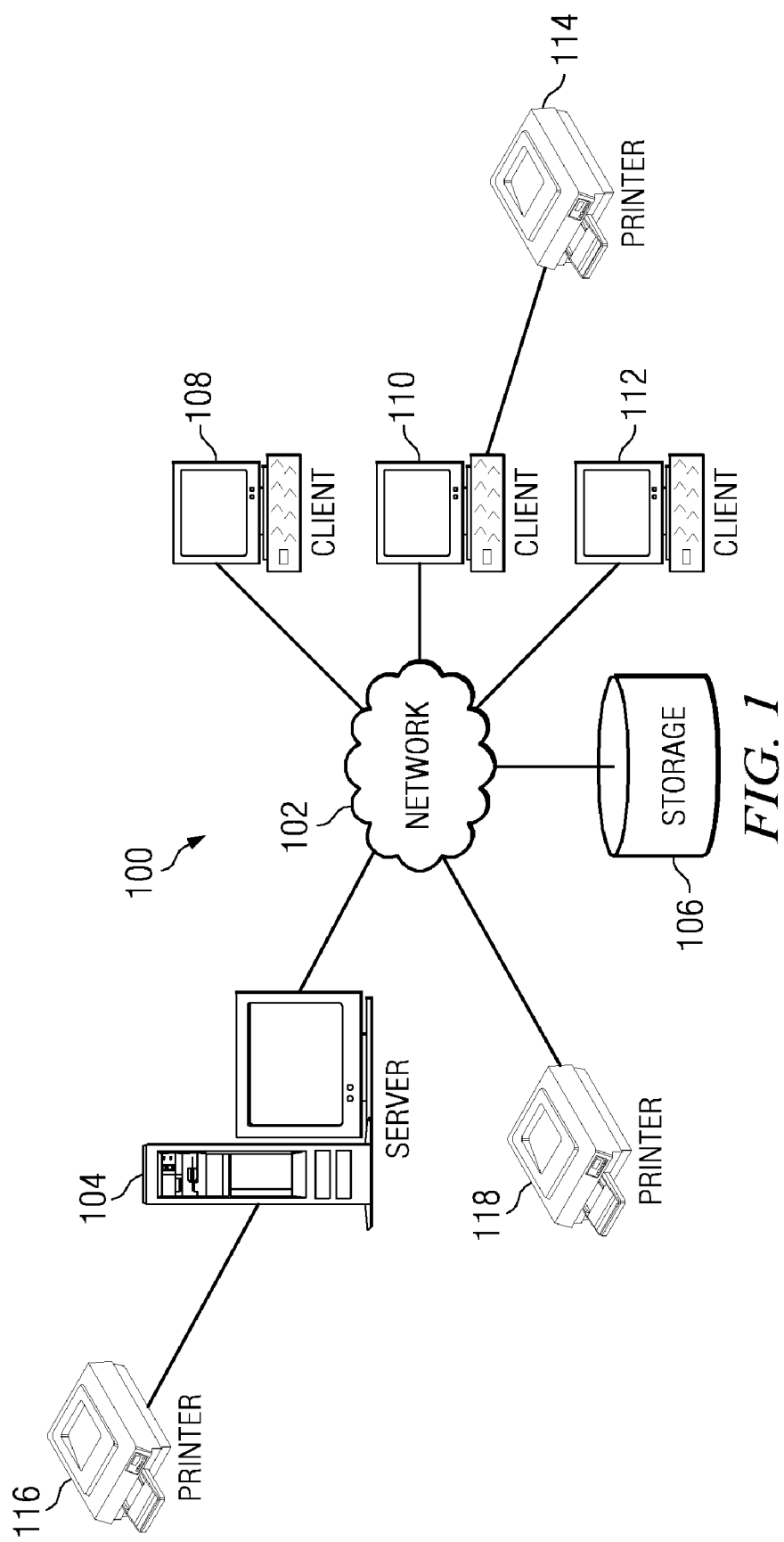
FIG. 1 is a pictorial representation of a network of data processing systems in which illustrative embodiments may be implemented.

Networked data processing system 100 is a network of computers in which the present invention may be implemented. Networked data processing system 100 contains network 102, which is the medium used to provide communications links between various devices and computers connected within networked data processing system 100. Network 102 may include permanent or temporary connections, and wireless or land line connections. In the depicted example, server 104 is connected to network 102, along with storage unit 106. In addition, clients 108, 110 and 112 are also connected to network 102. These clients, 108, 110 and 112, may be, for example, personal computers or network computers.

In the depicted example, server 104 provides data, such as boot files, operating system images and applications, to clients 108-112. Clients 108, 110 and 112 are clients to server 104. Networked data processing system 100 may include additional servers, clients, and other devices not shown. Networked data processing system 100 also includes printers 114, 116 and 118. A client, such as client 110, may print directly to printer 114. Clients such as client 108 and client 112 do not have directly attached printers. These clients may print to printer 116, which is attached to server 104, or to printer 118, which is a network printer that does not require connection to a computer for printing documents. Client 110, alternatively, may print to printer 116 or printer 118, depending on the printer type and the document requirements.

In the depicted example, networked data processing system 100 is the Internet, with network 102 representing a worldwide collection of networks and gateways that use the TCP/IP suite of protocols to communicate with one another. At the heart of the Internet is a backbone of high-speed data communication lines between major nodes or host computers consisting of thousands of commercial, government, education, and other computer systems that route data and messages. Of course, networked data processing system 100 also may be implemented as a number of different types of networks such as, for example, an Intranet or a local area network.

FIG. 1 is intended as an example and not as an architectural limitation for the processes of the present invention.

Figure 2:
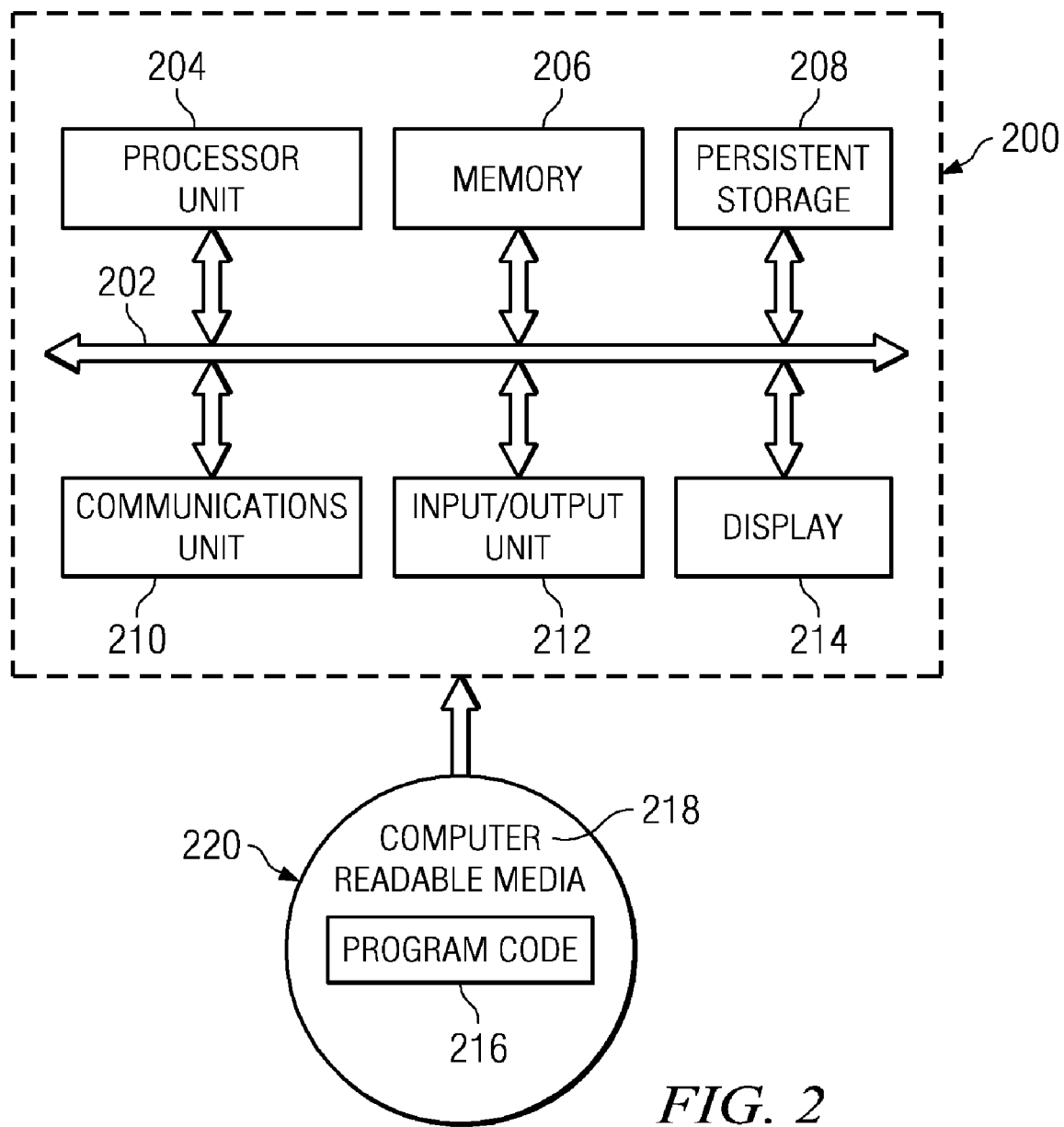
FIG. 2 is a block diagram of a data processing system in which illustrative embodiments may be implemented.

Turning now to FIG. 2, a diagram of a data processing system is depicted in accordance with an illustrative embodiment. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip.

As another illustrative example, processor unit 204 may be a symmetric multi-processor system containing multiple processors of the same type.

Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer readable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208 and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Oftentimes, users are required to share network printers. Users on a local network, however, may desire that their documents be given priority over remote network users. The illustrative embodiments recognize a need for a data processing system that is capable of controlling print requests so as to prioritize print requests originating from a local user on a local network over the print requests of a remote user on a remote network. Therefore, the illustrative embodiments provide a computer implemented method and computer program product for prioritizing local network print requests. In one embodiment, a printer shared on multiple networks is configured to a set of parameters defined by an administrator for prioritizing the print requests from a local network. A first print request is received from a first user on a remote network. The first print request originating from the first user on a remote network starts printing. A second print request is received from a second user on a second network. In response to determining a match to the set of parameters, the first print request is interrupted in order to print the second print request on the printer. The first print request from the remote network is resumed once the second print request from the local network is completely printed.

Figures 3, 4:
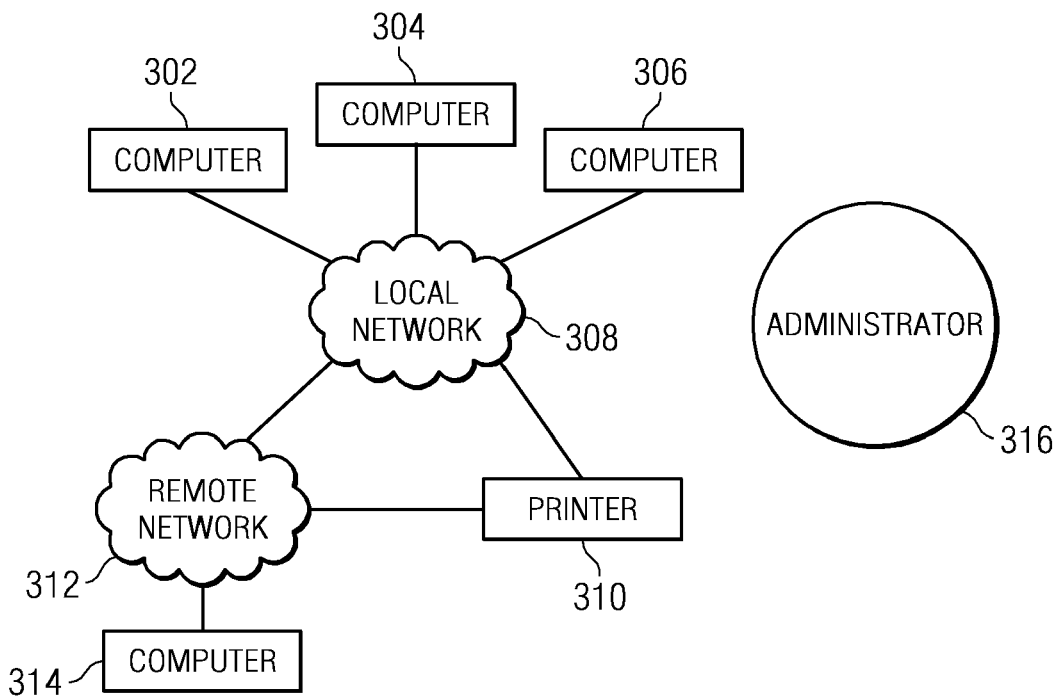
FIG. 3 is a block diagram illustrating components included for a shared printer over multiple networks in accordance with an illustrative embodiment.
FIG. 4 is a pictorial representation of a printer screen shot in accordance with an illustrative embodiment.

Referring to FIG. 3, a block diagram illustrating components included for a shared printer over multiple networks is illustrated in accordance with an illustrative embodiment. Computer 302, computer 304, and computer 306 are displayed in FIG. 3. Computer 302, computer 304, and computer 306 may be any type of personal computers or network computers, including without limitation, laptop computers or network computers. Computer 302, computer 304, and computer 306 are examples of clients 108, 110, and 112 as seen in FIG. 1. Computer 302, computer 304, and computer 306 are also connected to local network 308. Computer 302, computer 304, and computer 306 may be connected through cables or may be connected wirelessly to local network 308. The embodiment as described is not meant to imply any architectural limitation, but is only provided for illustrative purposes. One of ordinary skill in the art is aware that the number of computers connected to local network 308 and remote network 312 may be greater than or less than the amount of computers depicted in FIG. 3.

Local network 308 is a computer network. Therefore, local network 308 is an interconnection of a group of computers and other devices, including without limitation, printers, fax machines, telephones, PDAs, or scanners. Local network 308 may be classified according to scale, and may include a personal area network (PAN), campus area network (CAN), metropolitan area network (MAN), or wide area network (WAN). A network administrator, such as administrator 316, may be assigned to local network 308 and to the interconnection of computer 302, computer 304, and computer 306. Local network 308 may cover either a small or a wide geographic area, including homes, offices, buildings, or even cities and metroplexes.

Remote network 312 is also a component of FIG. 3. Remote network 312 is a network of interconnected computers, including computer 314. Remote network 312 may also be connected to other devices, including, without limitation, printers, scanners, fax machines, telephones, and PDA's. Additionally, remote network 312 may be defined by a geographic range. The geographic range of remote network 312 is different than the geographical area assigned to local network 308. Thus, one way to differentiate between local network 308 and remote network 312 is according to scale and size.

Local network 308 and remote network 312 may include the Intranet and the Extranet. The Intranet is a set of interconnected networks that uses the Internet Protocol and other tools such as web browsers. A single administrative entity usually controls these tools and Intranet. That administrative entity closes the Intranet to the rest of the world and has the authority to allow or deny users based on a set of parameters from accessing the Intranet and connected resources. Most commonly, the Intranet is the internal network of a company or other enterprise.

An Extranet is a network that is limited in scope to a single organization or entity, but which has limited connections to the networks of one or more other usually trusted organizations or entities. Technically, an Extranet may also be categorized as a campus area network (CAN), metropolitan area network (MAN), or wide area network (WAN), or other type of network. However, an Extranet cannot consist of a single local area network (LAN), because an Extranet must have at least one connection with an external network.

Printer 310 is also included in FIG. 3. Printer 310 may be any type of computer printer, which is a network device that produces a hard copy of documents stored in electronic form, usually on physical print media such as, without limitation, paper or transparencies. A user makes print requests on computer 302, computer 304, and computer 306 in order to print to printer 310. Printer 310 may be attached by a printer cable to a computer or a set of computers, which serves as a document source. Printer 310 may also be a network printer that is wirelessly connected to a set of computers and/or uses an Ethernet connection. Printer 310 may be an individual printer designed to support both local and network connected users at the same time.

Printer 310 may be designed for low-volume, short-turnaround print jobs or printer 310 may also be designed for higher volume print jobs. The printer speed for printer 310 is determined by the number of pages printed per minute by printer 310. Printer 310 is shared by computer 302, computer 304, computer 306, and computer 314. Accordingly, printer 310 may print documents as part of a print request made over either a local and/or a remote network. In another embodiment, print requests may be sent to a printer server before being sent to a shared network printer, such as printer 310.

Administrator 316 is a user with administrative rights over the interconnected networks and computers in FIG. 3. Administrative rights include, without limitation, configuring printer 310 to recognize when a user is printing from either local network 308 or remote network 312.

Local network 308 and remote network 312 may be distinguished based on their various Internet Protocol (IP) addresses. Every computer connected to the internet has a unique identifier called an Internet Protocol address. In other words, the Internet Protocol address is a computer address. On many networks, the Internet Protocol address of a computer is always the same. This type of Internet Protocol address is referred to as a static network. On other networks, a random Internet Protocol address is assigned each time a computer connects to the network, and is termed a dynamic Internet Protocol address. Static Internet Protocol addresses are manually assigned to a computer by an administrator, such as administrator 316. In contrast, dynamic Internet Protocol addresses are assigned either randomly by the computer itself or arbitrarily assigned by a server.

Administrator 316 may configure printer 310 to prioritize print requests received from a local user over that of a remote user. A local user is a user whose print request originates over local network 308. A remote user is a user whose print request originates over remote network 312. Administrator 316 may configure a set of working groups. An example of titles for these working groups could be "working group one" and "working group two". One with ordinary skill in the art would realize that one particular range of internet protocol addresses within an intranet could be assigned to "working group one", while a second range of internet protocol addresses within an intranet could be assigned to "working group two." In one embodiment, administrator 316 may configure printer 310 to recognize a set of internet protocol addresses assigned to a set of computers. Administrator 316 configures printer 310 to categorize certain addresses from this set of addresses as belonging to either a local or a remote network. Administrator 316 has administrative rights over this set of computers. This set of addresses is used by printer 310 to identify a client computer assigned a remote network address and a client computer assigned a local network address.

For example, computer 302, computer 304, and computer 306 are associated with local network 308. Administrator 316 configures printer 310 to recognize the set of Internet Protocol (IP) addresses associated with computer 302, computer 304, and computer 306 as being located on local network 308. Any Internet Protocol addresses not configured as local by administrator 316 would be considered as remote addresses. In this example, computer 314 is identified as being located on remote network 312.

In accordance with one embodiment, a user submits a print request of a document from computer 314 to printer 310. Printer 310 accepts the print request and begins printing the document from computer 314. However, another print request is submitted from computer 302. Since computer 302 is located on local network 308 and printer 310 identifies computer 302 as such, printer 310 postpones finishing the print request from computer 314. Instead, printer 310 initiates the print request from computer 302. Upon completion of the print request from computer 302, printer 310 resumes the print request that was postponed from computer 302.

In one embodiment, when printer 310 delays printing of a document originating from a local user or a local network computer, printer 310 prints out a sheet that indicates that this print request was interrupted. This sheet may be termed a "header sheet". The header sheet contains information of importance to the user who made the print request from the local and from the remote network. This information includes, without limitation, the time that the document began printing, the time that the document was interrupted, the number of pages printed, the remaining number of pages to be printed, the name of the user who originally made the print request, or the name of the client computer.

Furthermore, administrator 316 may configure printer 310 to print a minimum number of pages of the print job originating from remote network 312 before interrupting this print job and initiating the print job originating from local network 308. Thus, printer 310 prints a minimum number of pages each time printer 310 is printing any portion of a print request originating from a computer, such as computer 314, from a remote network, such as remote network 312. For example, printer 310 may be configured to print at least 20 pages of a print request from remote network 312 before starting on a print request from local network 308. Additionally, printer 310 is configured to print a maximum number of pages of a print request originating from a remote network, such as remote network 312, before initiating a print request originating from a local network, such as local network 308. This feature ensures greater efficiency for either a local user or a remote user to receive his print request in a timely fashion, without having too many header sheets printed with the print request.

In one embodiment, administrator 316 may configure a setting termed "urgent" that a remote network user may ascribe to a document. If a document is marked "urgent" from a remote network user, printer 310 does not interrupt the printing of this print request. Administrator 316 maintains the authority, however, to override the print request if administrator 316 so chooses. Additionally, administrator 316 may configure printer 310 to allow only a maximum amount of pages that a remote user may print for a print request marked "urgent". Administrator 316 may also configure printer 310 to allow only a certain number of documents originating from a user or client computer on remote network 312 to be marked as "urgent" over a specific time period. For example, administrator 316 may allow a user associated with computer 314 to characterize only 10 documents a week as "urgent". Thus, administrator 316 may provide some flexibility to remote network users who do not want certain print requests of high priority to be postponed by print requests originating from local network 308.

FIG. 4 is a pictorial representation of a printer screen shot in accordance with an illustrative embodiment. In one embodiment, this printer screen shot appears to a user located on a client computer, such as computer 302, computer 304, computer 306, or computer 314 in FIG. 3. Printer A 402 indicates the printer that is serving as a shared network printer. The printer screen shot contains information of relevance to a local user or a remote user. This information includes, without limitation, document name, status, number of pages, and the network of origin for the print request. Status 406 and network 408 are components of this printer screen shot. Status 406 indicates to the user whether the current status of the print request. Status 406 includes descriptive indicators of the status of the print request, including "completed", "on hold", and "printing".

In FIG. 4, report 3 originates from a local network user. An administrator for Printer A in FIG. 4 has configured the printer to prioritize documents printed from a local network printer. Thus, in FIG. 4, report 3 is given priority over report 2, since report 2 is a print request originating from a remote network user. However, the printer screen shot in FIG. 4 allows a user on either the local or the remote network to understand the status of the user's print request.

Figure 5:
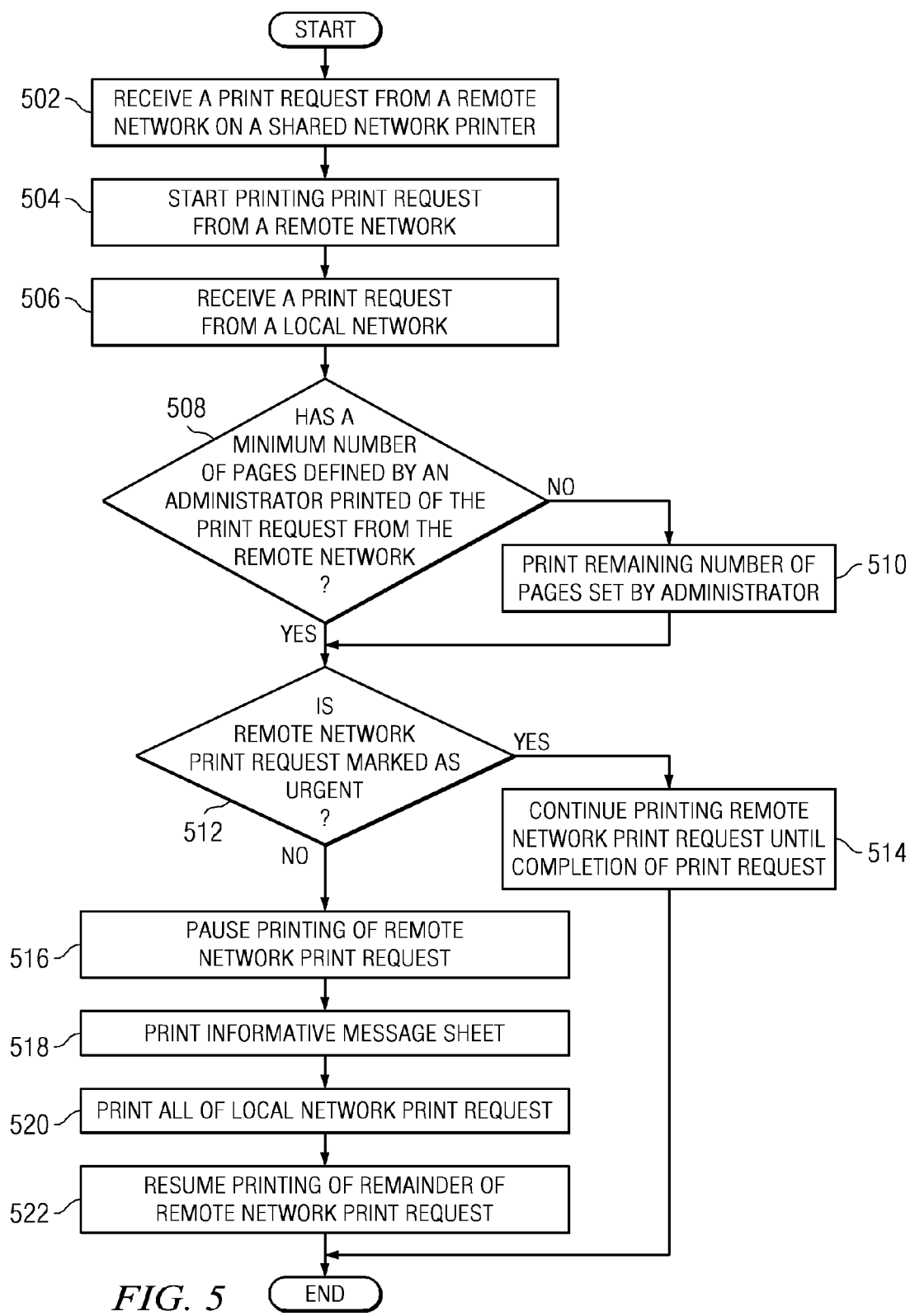
FIG. 5 is a flowchart illustrating one example of a process for prioritizing print requests from a user on a local network in accordance with an illustrative embodiment.

FIG. 5 is a flowchart illustrating a process for prioritizing print requests from a user on a local network in accordance with an illustrative embodiment. The process starts by receiving a print request from a remote network on a shared network printer (step 502). The process then starts printing a print request from a remote network (step 504). The process then receives a print request from a local network (step 506). The process then determines whether a minimum number of pages defined by an administrator printed of the print request originating from the remote network (step 508). If the answer to this query is yes, then the process proceeds to print the remaining number of pages set by the administrator (step 510). The process proceeds to step 512. If the process determines that a minimum number of pages printed, the process proceeds to step 512. The process then makes a determination whether a remote network print request is marked as urgent (step 512). If the process makes a determination that the remote network print request is marked as urgent, then the process continues printing the remote network print request until completion of the print request (step 514). The process terminates thereafter.

If the process makes a determination that the remote network print request is not marked as urgent at step 512, then the process pauses (suspends) printing of the remote network print request (step 516). The process then prints an informative message sheet (step 518). In one embodiment, the informative message sheet is the equivalent of what is termed as a "header sheet" as previously described. Next, the process prints the entire local network print request (step 520). The process then resumes printing of the remainder of the remote network print request (step 522). The process terminates thereafter.—

The illustrative embodiments recognize a need for printer that is configured to prioritize print requests originating from a local network computer over a print request originating from a remote network computer. This invention offers the advantage to local users who may require documents more urgently than a remote network user to be able to receive print requests sooner. Additionally, this invention provides local and remote users with greater control of their print requests. A remote user may choose to print his documents at a time when the user knows that local users will not be making print requests in order to avoid having his documents postponed. The illustrated embodiments also provide for a remote user the ability to mark a document as urgent and avoid any interruptions of the printing of this document, allowing for greater control of his print requests.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc. Furthermore, the invention can take the form of a computer program product accessible from a computer-usable or computer-readable data storage medium providing program code for use by or in connection with a computer or any instruction execution system. For the purposes of this description, a computer-usable or computer readable medium can be any tangible apparatus that can store the program for use by or in connection with the instruction execution system, apparatus, or device.

The data storage medium can be an electronic, magnetic, optical, or semiconductor system (or apparatus or device). Examples of a computer-readable data storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters. The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for prioritizing print requests from a local network to a printer shared on multiple networks, the method comprising:
   a processor configuring the printer shared on multiple networks to a set of parameters defined by an administrator for prioritizing print requests received from users on the local network;
   the processor receiving a first print request from a first user on a remote network;
   the processor causing the printer to print the first print request from the first user on the remote network;
   the processor receiving a second print request from a second user on the local network;
   the processor identifying an originating network from which the first print request was received and an originating network from which the second print request was received;
   responsive to a determination that the originating network from which the first print request was received is the remote network and that the originating network from which the second print request was received is the local network, the processor determining whether a match to the set of parameters is present;
   responsive to a determination that the match to the set of parameters is present, the processor causing the printer to interrupt printing of the first print request in order to cause the printer to print the second print request; and
   the processor causing the printer to resume the printing of the first print request from the remote network once the second print request is completely printed.

2. The method of claim 1, wherein the set of parameters includes a parameter that allows a print request received from the local network to take precedence over only a large print request received from the remote network, wherein a size of the large print request is defined by a user with administrative rights.

3. The method of claim 1, wherein the printer is shared on multiple networks comprising at least one local network and at least one remote network, wherein the local network comprises a set of computers located within a defined range of network addresses.

4. The method of claim 1, wherein the set of parameters includes a parameter that allows for detecting that a print request from the remote network is marked as urgent.

5. The method of claim 4, further comprising:
   the processor detecting that the print request from the remote network is marked as urgent, and in response, the processor causing the printer to print the print request from the remote network marked as urgent without being interrupted by a print request from the local network.

6. The method of claim 5, wherein the set of parameters includes a parameter that allows for detecting that a maximum amount of pages in a print request from the remote network marked as urgent have been printed on the printer shared on multiple networks that recognizes a print request marked as urgent.

7. The method of claim 6, further comprising:
   the processor causing a display device to present a graphical user interface, wherein the graphical user interface indicates an order for printing the print requests and a set of characteristics relevant to printing the print requests including the originating network associated with each of the print requests.

8. The method of claim 1, further comprising:
   the processor causing the printer to print a header sheet separating a local network print request from a remote network print request, wherein the header sheet separates the local network print request from the remote network print request and indicates that the remote network print request was interrupted by the local network print request.

9. The method of claim 8, wherein the header sheet further comprises a number of pages completed for the remote network print request, a remaining number of pages for the remote network print request, a time that the remote network print request began printing, a name of the user originating the remote network print request, and a time when the remote network print request was interrupted.

10. The method of claim 1, further comprising:
    the processor causing the printer to print a certain number of pages of the first print request prior to causing the printer to interrupt the printing of the first print request received from the remote network and causing the printer to print the second print request.

11. The method of claim 1, further comprising:
    the computer configuring the printer to control the printing of large documents, wherein large has a different definition for the second print request than the first print request.

12. A computer program product for prioritizing print requests from a local network to a printer shared on multiple networks, the computer program product comprising:
    computer usable code stored on a computer readable tangible storage device, the computer usable code comprising:
    computer usable code for configuring the printer shared on multiple networks to a set of parameters defined by an administrator for prioritizing the print requests received from users on the local network;
    computer usable code for receiving a first print request from a first user on a remote network;
    computer useable code for causing the printer to print the first print request from the first user on the remote network;

computer useable code for receiving a second print request from a second user on the local network;

computer useable code for identifying an originating network from which the first print request was received and an originating network from which the second print request was received;

computer useable code, responsive to a determination that the originating network from which the first print request was received is the remote network and that the originating network from which the second print request was received is the local network, for determining whether a match to the set of parameters is present;

computer useable code, responsive to a determination that the match to the set of parameters is present, for causing the printer to interrupt printing of the first print request in order to cause the printer to print the second print request; and computer useable code for resuming the printing of the first print request once the second print request is completely printed.

13. The computer program product of claim 12, wherein the set of parameters includes a parameter that allows a print request received from the local network to take precedence over only a large print request received from the remote network, wherein a size of the large print request is defined by a user with administrative rights.

14. The computer program product of claim 12, wherein the printer is shared on multiple networks comprising at least one local network and at least one remote network, wherein the local network comprises a set of computers located within a defined range of network addresses.

15. The computer program product of claim 12, wherein the set of parameters includes a parameter that allows for detecting that a print request from the remote network is marked as urgent.

16. The computer program product of claim 12, further comprising:
computer useable code stored on the computer readable tangible storage device for causing a display device to present a graphical user interface, wherein the graphical user interface indicates an order for printing the print requests and a set of characteristics relevant to printing the print requests including the originating network associated with each of the print requests.

17. The computer program product of claim 12, further comprising:
computer useable code stored on the computer readable tangible storage device for causing the printer to print a header sheet separating a local network print request from a remote network print request, wherein the header sheet separates the local network print request from the remote network print request and indicates that the remote network print request was interrupted by the local network print request.

18. The computer program product of claim 17, wherein the header sheet further comprises a number of pages completed for the remote network print request, a remaining number of pages for the remote network print request, a time that the remote network print request began printing, a name of the user originating the remote network print request, and a time when the remote network print request was interrupted.

19. The computer program product of claim 12, further comprising:
computer useable code stored on the computer readable tangible storage device for causing the printer to print a certain number of pages of the first print request prior to causing the printer to interrupt the first print request and causing the printer to print the second print request.

20. The computer program product of claim 12, further comprising:
computer useable code stored on the computer readable tangible storage device for configuring the printer to control the printing of large documents, wherein large has a different definition for the second print request than the first print request.

* * * * *